(12) United States Patent
Togino

(10) Patent No.: US 7,800,826 B2
(45) Date of Patent: Sep. 21, 2010

(54) OPTICAL SYSTEM

(75) Inventor: Takayoshi Togino, Koganei (JP)

(73) Assignee: Olympus Corporation, Tokyo (JP)

( * ) Notice: Subject to any disclaimer, the term of this patent is extended or adjusted under 35 U.S.C. 154(b) by 189 days.

(21) Appl. No.: 11/649,469

(22) Filed: Jan. 3, 2007

(65) Prior Publication Data

US 2007/0153401 A1 Jul. 5, 2007

(30) Foreign Application Priority Data

Jan. 4, 2006 (JP) ............................. 2006-000046

(51) Int. Cl.
*G02B 27/14* (2006.01)
*G02B 13/06* (2006.01)

(52) U.S. Cl. ...................................... 359/631; 359/725
(58) Field of Classification Search ................. 359/631, 359/725–729; 348/36; 353/46–51
See application file for complete search history.

(56) References Cited

U.S. PATENT DOCUMENTS

| | | | | | |
|---|---|---|---|---|---|
| 2,638,033 | A | * | 5/1953 | Buchele et al. | ............. 359/725 |
| 3,151,524 | A | * | 10/1964 | Bouwers | ...................... 359/725 |
| 3,170,025 | A | * | 2/1965 | Ino | ............................. 359/725 |
| 3,283,653 | A | | 11/1966 | Tokarzewski | |
| 3,404,934 | A | * | 10/1968 | Brachvogel et al. | ......... 359/504 |
| 3,552,820 | A | | 1/1971 | Brachvogel | |
| 4,566,763 | A | * | 1/1986 | Greguss | ...................... 359/725 |
| 5,473,474 | A | | 12/1995 | Powell | |
| 5,631,778 | A | * | 5/1997 | Powell | ........................ 359/724 |
| 6,333,826 | B1 | * | 12/2001 | Charles | ....................... 359/725 |
| 6,449,103 | B1 | * | 9/2002 | Charles | ....................... 359/725 |
| 6,597,520 | B2 | | 7/2003 | Wallerstein et al. | |
| 6,611,282 | B1 | | 8/2003 | Trubko et al. | |
| 6,646,818 | B2 | * | 11/2003 | Doi | ............................ 359/725 |
| 6,789,908 | B2 | * | 9/2004 | Garcia | ......................... 359/859 |
| 7,224,387 | B2 | * | 5/2007 | Boyd | ........................ 348/239 |
| 2002/0149752 | A1 | * | 10/2002 | Courchesne | ................ 353/122 |
| 2004/0008423 | A1 | | 1/2004 | Driscoll, Jr. et al. | |
| 2006/0023105 | A1 | * | 2/2006 | Kostrzewski et al. | ........ 348/335 |
| 2006/0164733 | A1 | * | 7/2006 | Gal et al. | ..................... 359/725 |

FOREIGN PATENT DOCUMENTS

JP 6-85019 3/1994
WO WO 2005071955 A1 * 8/2005

* cited by examiner

*Primary Examiner*—Jessica T Stultz
*Assistant Examiner*—Mahidere S Sahle
(74) *Attorney, Agent, or Firm*—Kenyon & Kenyon LLP

(57) ABSTRACT

The invention relates to an optical system with well corrected aberrations, which is adapted to take images from a full panoramic scene on a cylindrical, conical or other three-dimensional image surface or project such a three-dimensional display surface onto a full field of view in the distance. In an optical system adapted to form images from a 360° panoramic scene on a cylindrical or conical image surface 3, there is an annular refractive optical element 2 provided with the center axis 1 of rotation of the image surface 3 as the axis of rotational symmetry. There is further at least one reflective surface 4 provided with the center axis 1 of the rotation as the axis of rotational symmetry.

9 Claims, 10 Drawing Sheets

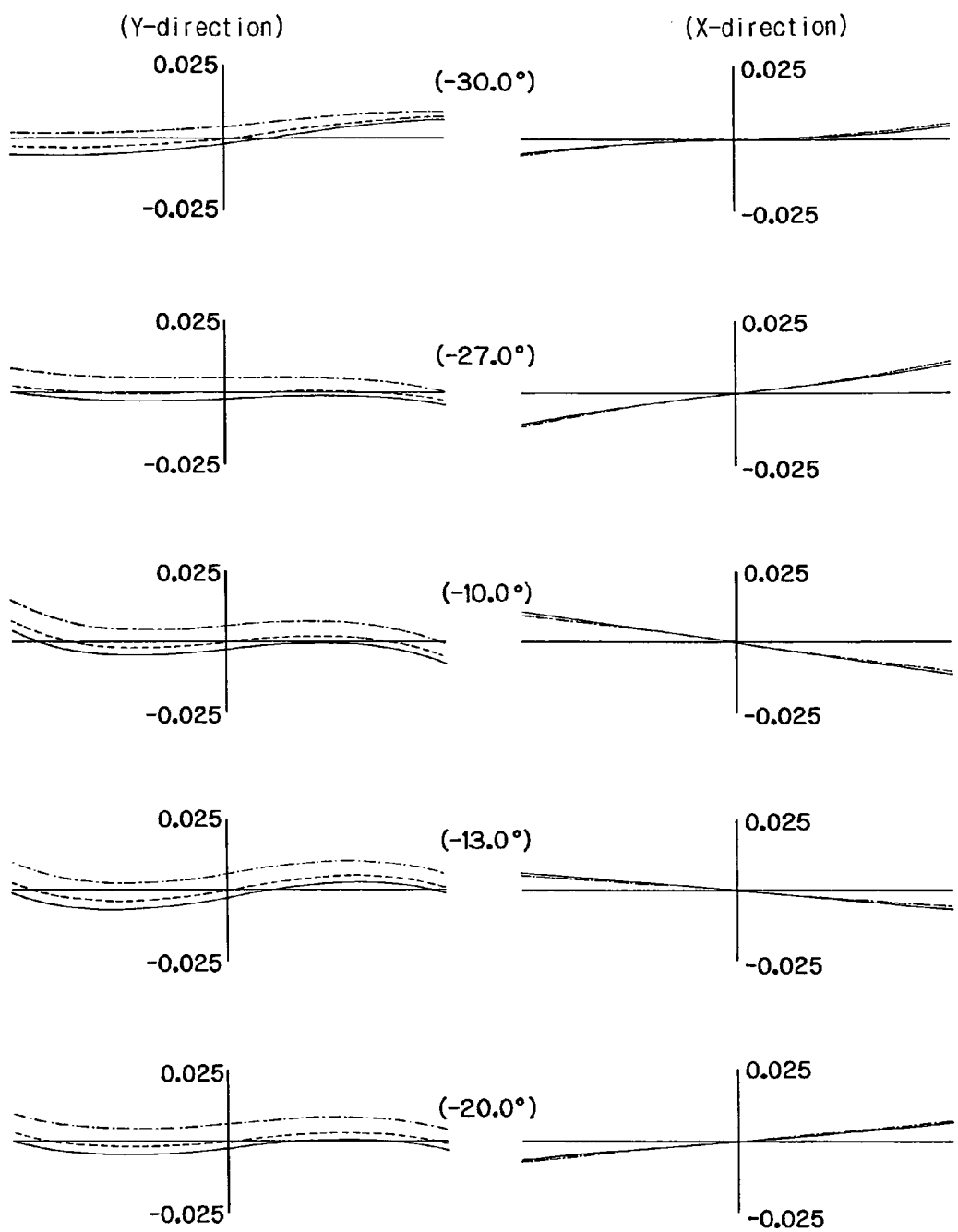

OPTICAL SYSTEM

This application claims benefit of Japanese Application No. 2006-46 filed in Japan on Jan. 4, 2006, the contents of which are incorporated by this reference.

BACKGROUND OF THE INVENTION

The present invention relates generally to an optical system, and more specifically to an optical system adapted to take images from a 360° panoramic scene on a cylindrical, conical or other three-dimensional imaging surface or to project a cylindrical, conical or other three-dimensional display surface onto a 360° field of view.

For the projection of images onto a 360° screen, the linking of images from multiple projectors to one another has been implemented, or a wide-angle optical system such as a fisheye lens has been used. Such prior arts are typically set forth in the following publications.
Patent Publication 1
U.S. patent application Ser. No. 2004/8423
Patent Publication 2
JP-B 6-85019
Patent Publication 3
U.S. Pat. No. 5,473,474
Patent Publication 4
U.S. Pat. No. 3,283,653
Patent Publication 5
U.S. Pat. No. 3,552,820
Patent Publication 6
U.S. Pat. No. 6,611,282
Patent Publication 7
U.S. Pat. No. 6,597,520

For the projection of images onto the 360° field of view or vice versa, they have so far been projected from one single or multiple planes onto a cylindrical or spherical surface, or vice versa; until now, however, there is nothing known about the projection of images from, for instance, a cylindrical, spherical or conical surface onto a cylindrical or spherical surface or vice versa.

In this connection, as can be seen from organic EL devices, future display or imaging devices are fairly likely to have a display or imaging surface defined by a cylindrical, spherical, conical or other rotationally symmetric surface.

SUMMARY OF THE INVENTION

In view of such prior art situations as described above, an object of the present invention is to provide an optical system with well corrected aberrations, which is adapted to take images from a 360° panoramic scene on a cylindrical, conical or other three-dimensional display surface or project such a three-dimensional display surface onto a 360° field of view in the distance.

According to the invention, this object is achieved by the provision of an optical system adapted to form images from a 360° panoramic scene on a cylindrical or conical image surface, characterized by comprising an annular refractive optical element with a center axis of rotation of said image surface as an axis of rotational symmetry.

Preferably in that case, said annular refractive optical element has a power with respect to a sagittal section different from a power with respect to a meridional section.

The aforesaid optical system preferably comprises at least one reflective surface with said center axis of rotation as an axis of rotational symmetry.

In that case, it is preferable to satisfy the following condition (1):

$$1.1 < |Pms|, \text{ or } |Pms| < 0.9 \tag{1}$$

where Pms is a power ratio between a meridional section and a sagittal section with respect to at least one surface of said refractive optical element.

It is also preferable that said refractive optical element is located on an entrance side of, and spaced away from, said reflective surface on an optical path with the center axis of rotation positioned between them, or between said reflective surface and said image surface.

Further, it is preferable that said optical system comprises an entrance pupil and an exit pupil on or near said axis of rotational symmetry, said refractive optical element, said reflective surface and said image surface are located off said axis of rotational symmetry, and light of an image from the 360° panoramic scene takes a decentered optical path where said light travels in order of the refractive optical element, entrance pupil, reflective surface, image surface and exit pupil, or in order of the entrance pupil, reflective surface, refractive optical element, image surface and exit pupil.

Still further, it is preferable that said reflective surface has a rotationally symmetric shape defined by rotation about the axis of rotational symmetry of a line segment of any desired shape that has no plane of symmetry in a section including the axis of rotational symmetry, or a rotationally symmetric shape defined by rotation about the axis of rotational symmetry of a line segment of any desired shape that includes an odd-numbered term in a section including the axis of rotational symmetry.

If the object surface and image surface of said optical system are reversed, then it could be used as a projection optical system.

The present invention as recited above is concerned with an optical system adapted to take images from a 360° panoramic scene on, for instance, a cylindrical, conical or other three-dimensional imaging surface or project such a three-dimensional display surface onto a 360° field of view. According to the present invention, it is thus possible to obtain an imaging and a projection optical system that are capable of independently correcting field curvatures and tilts with respect to the meridional and the sagittal section, and are slimmed down with well corrected aberrations and good resolving power.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 9 is a transverse aberration diagram for the whole optical system of Example 3.

DESCRIPTION OF THE PREFERRED EMBODIMENT

The optical system of the invention is now explained with reference to examples. In principles, when it is an imaging system, it will be explained with reference to normal ray tracing, and when it is a projection system, it will be explained with reference to back ray tracing.

If images from the 360° panoramic scene in the distance can be formed on a cylindrical or conical image surface, an imaging system for images from the 360° panoramic scene can be simplified and slimmed down. When the imaging system is built up of transmission lenses as usual, there is one possible approach where multiple projection lens systems are radially located around a cylindrical imaging surface to take images from the 360° panoramic scene. With this approach, however, it would be impossible to link together all the taken images unless the alignment of the transmission lens systems is under strict control.

A projection system can be simplified and slimmed down by permitting images displayed on a display device having a cylindrical or conical display surface to be projected onto a 360° field of view in the distance. When the projection system is built up of transmission lenses as usual, there is one possible approach where multiple projection lens systems are radially located around a cylindrical display surface to project images onto the 360° field of view. With this approach, however, it would be impossible to link together all the projected images unless the alignment of the transmission lens systems is under strict control.

Further, the image surface of each optical system (a taking lens system in the case of the imaging system, and a projection lens system in the case of the projection system) is defined by a cylindrical surface that is curved in one direction only; for correction of this, it is necessary to use a rotationally asymmetric optical surface that is difficult to fabricate.

With such an optical system as used in the prior art, images from the full 360° panoramic scene are formed as flat, annular images (such display images are formed in the event of the projection system), so such distorted images must be electronically converted into right ones for viewing. In the event of the projection system, on the other hand, the right images must be electronically converted into such annularly distorted ones.

The requirement for the invention, therefore, is to have an annular refractive optical element comprising a curved surface with the center axis of the image surface as the axis of rotational symmetry so as to form images from the 360° panoramic scene on such a rotationally symmetric, three-dimensional image surface as described above.

Figure 1:
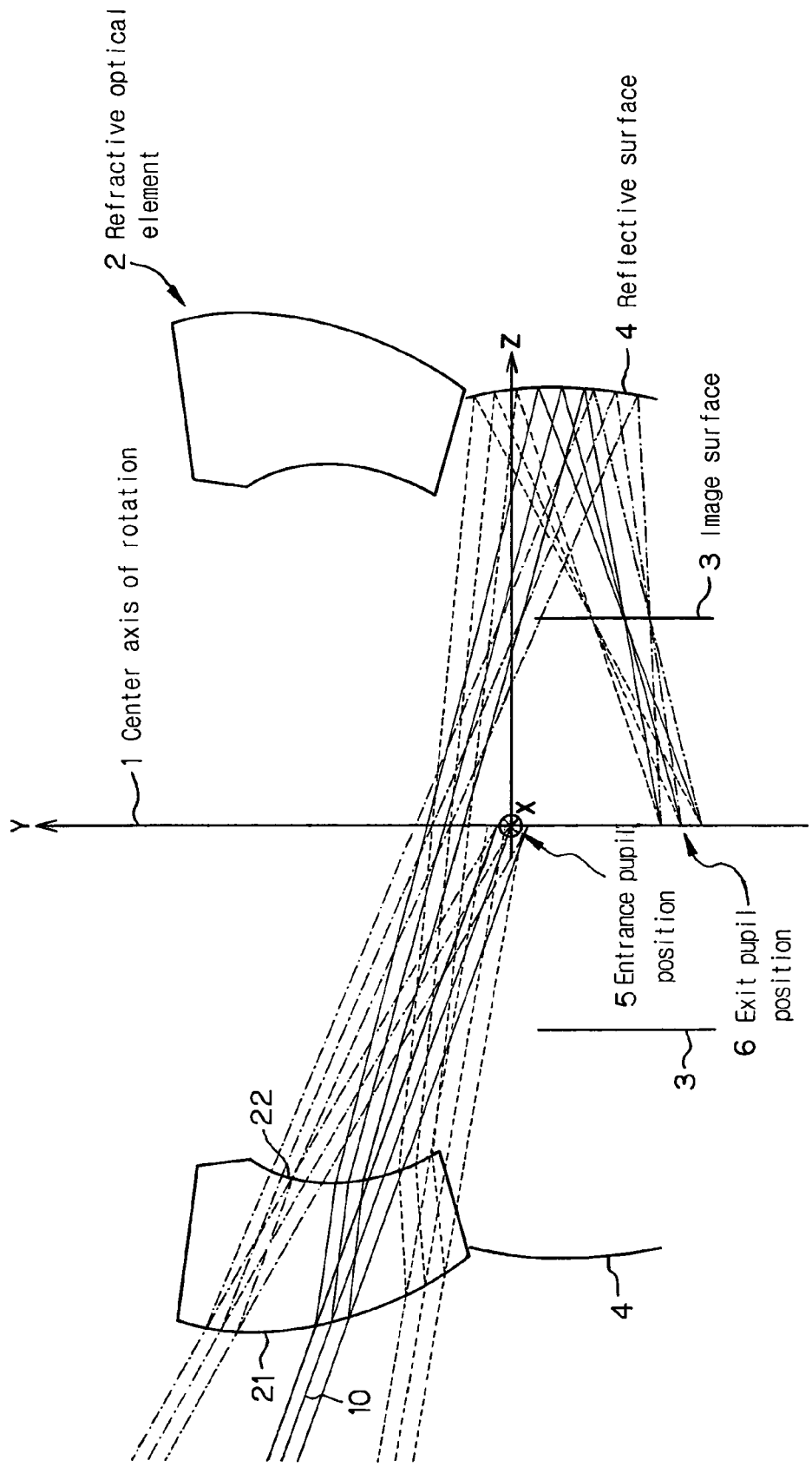
FIG. 1 is illustrative in section of the optical system of Example 1 according to the invention, as taken along the axis of rotational symmetry.

FIG. 1 is illustrative in section of the optical system of Example 1 to be referred to later, inclusive of the center axis 1 of rotation (the axis of rotational symmetry). This optical system is to form images from the 360° panoramic scene in the distance onto an image surface 3 that has a rotationally symmetric, three-dimensional shape about the center axis 1 of rotation (a cylindrical image surface in this example), comprising refractive surfaces 21 and 22 with the center axis 1 of rotation as the axis of rotational symmetry, and having an annular refractive optical element 2 comprising a transparent medium having a refractive index of greater than 1.

With the prior art optical system having only a limited degree of flexibility, it is impossible to make simultaneous and good correction of field curvatures and tilts with respect to a meridional section (a section including the center axis 1 of rotation) and in a sagittal section (a section that includes an axial chief ray 10 in the meridional section and vertical to the meridional section), leaving behind aberrations.

Therefore, the present invention makes use of the rotationally symmetric refractive optical element 2 that, albeit having substantially no power in the meridional section, is effective for correction of tight filed curvatures or tilts with respect to the meridional section by each angle of view, thereby making correction of the field curvature or tilt for the meridional section.

Preferably, that optical system has at least one reflective surface 4 with the center axis 1 of rotation as the axis of rotational symmetry.

More preferably, that reflective surface 4 has a rotationally symmetric shape defined by rotation about the axis 1 of rotational symmetry of a line segment of any shape in a section including the center axis 1 of rotation. That shape enables the reflective surface 4 to be different in the radius of curvature between the meridional and the sagittal section, and in turn makes correction of decentration coma possible; it can be more effectively used in combination with the annular refractive optical element 2.

In this conjunction, it is more preferable to satisfy the following condition:

$$1.1<|Pms|, \text{ or } |Pms|<0.9 \qquad (1)$$

where Pms is the power ratio between the meridional and the sagittal section of a transmission surface 21.

This condition (1) is indicative of the power ratio between the meridional and the sagittal section of the reflective surface 4, and that power ratio is 1 for an ordinary lens. For the independent correction of the field curvatures and tilts for the meridional and the sagittal section as contemplated in the optical system of the invention, however, it is important to satisfy the above condition.

More preferably, the refractive optical element 2 is located on, and spaced away from, the entrance side of the reflective surface 4 on the optical path, with the center axis 1 of rotation between them. This arrangement is particularly favorable for when it is intended to make the angle of view wide, and a wide-angle arrangement is achievable by allowing the meridional section to have a negative power.

When the refractive optical element 2 is located between the reflective surface 4 and the image surface 3 on the optical path, it is preferably configured into such a wedge shape as to correct the field tilt of the image surface across the meridional section. Further, by allowing the refractive optical element 2 to have a positive power across the meridional section, it is also possible to correct the field curvature for the meridional section.

In order to prevent the image surface 3 itself from cutting off light rays incident on the reflective surface from far, it is further important to take on a decentered arrangement wherein an entrance pupil 5 and an exit pupil 6 are located in this order in the direction of the axis 1 of rotation symmetry, and the refractive optical element 2, reflective surface 4 and image surface 3 are located off the axis 1 of rotational symmetry. It is then preferable to take on a decentration optical path arrangement wherein light travels in the order of refractive optical element 2, entrance pupil 5, reflective surface 4, image surface 3 and exit pupil 6 (FIG. 1) or in the order of entrance pupil 5, reflective surface 4, refractive optical element 2, image surface 3 and exit pupil 6.

With the above arrangement wherein a light beam takes a bent decentration optical path, there is asymmetric astigmatism produced even in the center of the vertical direction of the screen in particular. For the correction of this, it is preferable to use for the reflective surface 4 a toric surface that differs in curvature between a direction along the axis 1 of rotational asymmetry and a direction orthogonal to that direction, at least rather than a spherical surface.

More preferably, the reflective surface 4 has a rotationally symmetric shape defined by rotation about the axis 1 of rotational symmetry of a line segment of any shape having no plane of symmetry in a section including the axis 1 of rotational symmetry or a rotationally symmetric shape defined by rotation about the axis 1 of rotational symmetry of a line segment of any shape including an odd-numbered term in a section inclusive of the axis 1 of rotational symmetry.

As described above, the present invention is concerned with a taking optical system adapted to form images from a 360° panoramic scene on a cylindrical or conical image surface or a projection optical system adapted to project images displayed on a display device having a cylindrical or conical display surface onto a 360° field of view in the distance, wherein high-resolution images with no field curvature or tilt can be taken or projected. Further, the optical system of the invention, because of being constructed of surfaces of rotational symmetry with respect to the center axis, can be processed by a processing technique similar to that for ordinary rotationally symmetric aspheric surfaces, and so fabricated at ever lower costs.

Set out below are the values of the power ratio Pms in the refractive surface 21 in each of Examples 1-3, given below.

| | Example | | |
|---|---|---|---|
| | 1 | 2 | 3 |
| Pms | 3.157 | 0.351 | 0.669 |

Examples 1 to 3 of the optical system according to the invention are now described. Essential parameters for these optical systems will be given later. The essential parameters in Examples 1-3 are based on the results of noraml ray tracing from an object surface in the distance (which means a far object point conjugate to the image surface 3) through a reference surface set in such a way as to include the center axis 1 of rotation (the origin of coordinates X, Y, Z), then the entrance pupil 5 and then the refractive optical element 2 and reflective surface 4 to the image surface 3.

Referring here to a coordinate system for normal ray tracing, as shown typically in FIG. 1, the origin of a decentered optical surface in a decentered optical system is defined by a reference surface position with the entrance pupil 5 projected onto the center axis 1 of rotation, the Y-axis positive direction is defined by the direction of the center axis 1 of rotation going away from the image surface 3, and the Y-Z plane is defined by the sheet plane of FIG. 1. And then, the Z-positive positive direction is defined by a direction opposite to the image surface side of the object surface now considered in the sheet plane of FIG. 1, and the X-axis positive direction is defined by an axis that forms a right-handed orthogonal coordinate system with the Y-axis and Z-axis.

Given for a decentered surface are the quantity of decentration from the center of the origin of the aforesaid optical system on a coordinate system on which that surface is defined (X, Y and Z are indicative of the X-axis direction, the Y-axis direction, and the Z-axis direction, respectively), and the angles of tilt ($\alpha$, $\beta$, $\gamma$ (°)) of the coordinate systems for defining the surfaces with the centers on the X-, Y- and Z-axes, respectively. In that case, the positive signs for $\alpha$ and $\beta$ mean counterclockwise rotation with respect to the positive directions of the respective axes, and the positive sign for $\gamma$ means clockwise rotation with respect to the positive direction of the Z-axis. Referring here to how to perform $\alpha$-, $\beta$- and $\gamma$-rotations of the center axis of the surface, the coordinate system that defines each surface is first $\alpha$-rotated counterclockwise about the X-axis of the coordinate system that is defined at the origin of the optical system. Then, the coordinate system is $\beta$-rotated counterclockwise about the Y-axis of the rotated new coordinate system. Finally, the coordinate system is $\gamma$-rotated clockwise about the Z-axis of the rotated new another coordinate system.

When, of optical surfaces forming the optical system of each example, a specific surface and the subsequent surface form together a coaxial optical system, there is a surface spacing given. Besides, the radius of curvature of each surface and the refractive index and Abbe number of the medium are given according to common practices.

In this conjunction, an aspheric surface is a rotationally symmetric aspheric surface given by the following defining formula:

$$Z=(Y^2/R)/[1+\{1-(1+k)Y^2/R^2\}^{1/2}]+aY^4+bY^6+cY^8+dY^{10}+ \quad (a)$$

Here, Z is an optical axis (axial chief ray) provided that the direction of propagation of light is taken as positive, Y is a direction vertical to that optical axis, R is a paraxial radius of curvature, k is a conical coefficient, and a, b, c, d are the fourth-, sixth-, eighth-, tenth-order aspheric coefficients, respectively. The Z-axis in this defining formula becomes the axis of the rotationally symmetric aspheric surface.

The term "toric surface" here includes an X toric surface and a Y toric surface, as defined below. It is here noted that a straight line passing through the origin of surface shape and vertical to an optical surface provides the axis of the toric surface. On an XYZ orthogonal coordinate system with respect to the origin of surface shape, the X toric surface is given by $$F(X)=Cx \cdot X^2/[1+\{1-(1+k)Cx^2 \cdot X^2\}^{1/2}]+aX^4+bX^6+cX^8+dX^{10}$$

$$Z=F(X)+(½)Cy\{Y^2+Z^2-F(X)^2\} \quad (b)$$

A curve F(X) is rotated about an axis passing through the center of the Y-axis direction curvature Cy in the Z-axis direction and parallel with the X-axis. The resultant surface becomes an aspheric surface in the X-Z plane, and a circle in the Y-Z plane.

The Y toric surface is given by $$F(Y) = Cy \cdot Y^2 / [1 + \{1 - (1+k)Cy^2 \cdot Y^2\}^{1/2}] + aY^4 + bY^6 + cY^8 + dY^{10}$$

$$Z = F(Y) + (\tfrac{1}{2})Cx\{X^2 + Z^2 - F(Y)^2\} \quad \text{(c)}$$

A curve F(Y) is rotated about an axis passing through the center of the X-axis direction curvature Cx in the Z-axis direction and parallel with the Y-axis. The resultant surface becomes an aspheric surface in the Y-Z plane, and a circle in the X-Z plane.

Note here that Z is the quantity of a displacement from a tangential plane with respect to the origin of surface shape, Cx is the X-axis direction curvature, Cy is the Y-axis direction curvature, k is a conical coefficient, and a, b, c and d are aspheric coefficients, and that between the X-axis direction radius of curvature Rx and Y-axis direction radius of curvature Ry and the curvatures Cx and Cy, there are the relations:

$$Rx = 1/Cx, \; Ry = 1/Cy$$

The extended rotation free-form surface is a rotationally symmetric surface given by the following definition.

First, there is the following curve (d) given, which passes on a Y-Z coordinate plane through its origin.

$$Z = (Y^2/RY)/[1 + \{1 - (C_1+1)Y^2/RY^2\}^{1/2}] + C_2Y + C_3Y^2 + C_4Y^3 + C_5Y^4 + C_6Y^5 + C_7Y^6 + \ldots + C_{21}Y^{20} + \ldots + C_{n+1}Y^n + \quad \text{(d)}$$

Then, there is a curve F(Y) given where the curve (d) is rotated by an angle θ (°) with left-handed rotation defined as positive relative to the X-axis positive direction. This curve F(Y), too, passes on the Y-Z coordinate plane through the origin.

That curve F(Y) is parallel translated by a distance R in the Z-positive direction (in the Z-negative direction in the case of a negative sign), and the parallel translated curve is then rotated about the Y-axis. The thus obtained rotationally symmetric surface gives an extended rotation free-from surface.

As a consequence, the extended rotation free-form surface provides a free-form surface (smooth curve) in the Y-Z plane, and a circle with a radius |R| in the X-Z plane.

From this definition, the Y-axis becomes the axis of the extended rotation free-form surface (the axis of rotational symmetry).

Here, RY is the radius of curvature of a spherical term in the Y-Z section, $C_1$ is a conical constant, and $C_2$, $C_3$, $C_4$, $C_5$, ... are the first-, second-, third- and fourth-order aspheric coefficients, respectively.

In this regard, it is noted that a cylindrical surface (Y cylindrical surface) with an axis parallel with the Y-axis as the center axis is given as one Y toric surface; there is a Y toric surface of Rx=(the radius of the cylindrical surface) given provided that Ry=∞, k, a, b, c, d, etc.=0, and Rx=(the radius of the cylindrical surface).

It is also noted that a conical surface with an axis parallel with the Y-axis as the center axis is given as one extended rotation free-form surface; it is given in terms of RY=∞, $C_1$, $C_2$, $C_3$, $C_4$, $C_5$, etc.=0, θ=(the angle of inclination of the conical surface), and R=(the radius of the base in the X-Z plane).

Further, a term relating to an aspheric surface with no data given in the essential parameters described later is zero. The refractive index and Abbe number are given on a d-line basis (of 587.56 nm wavelength), and length is given in mm. The decentration of each surface is represented in terms of the quantity of decentration from the reference surface.

EXAMPLE 1

Figure 2:
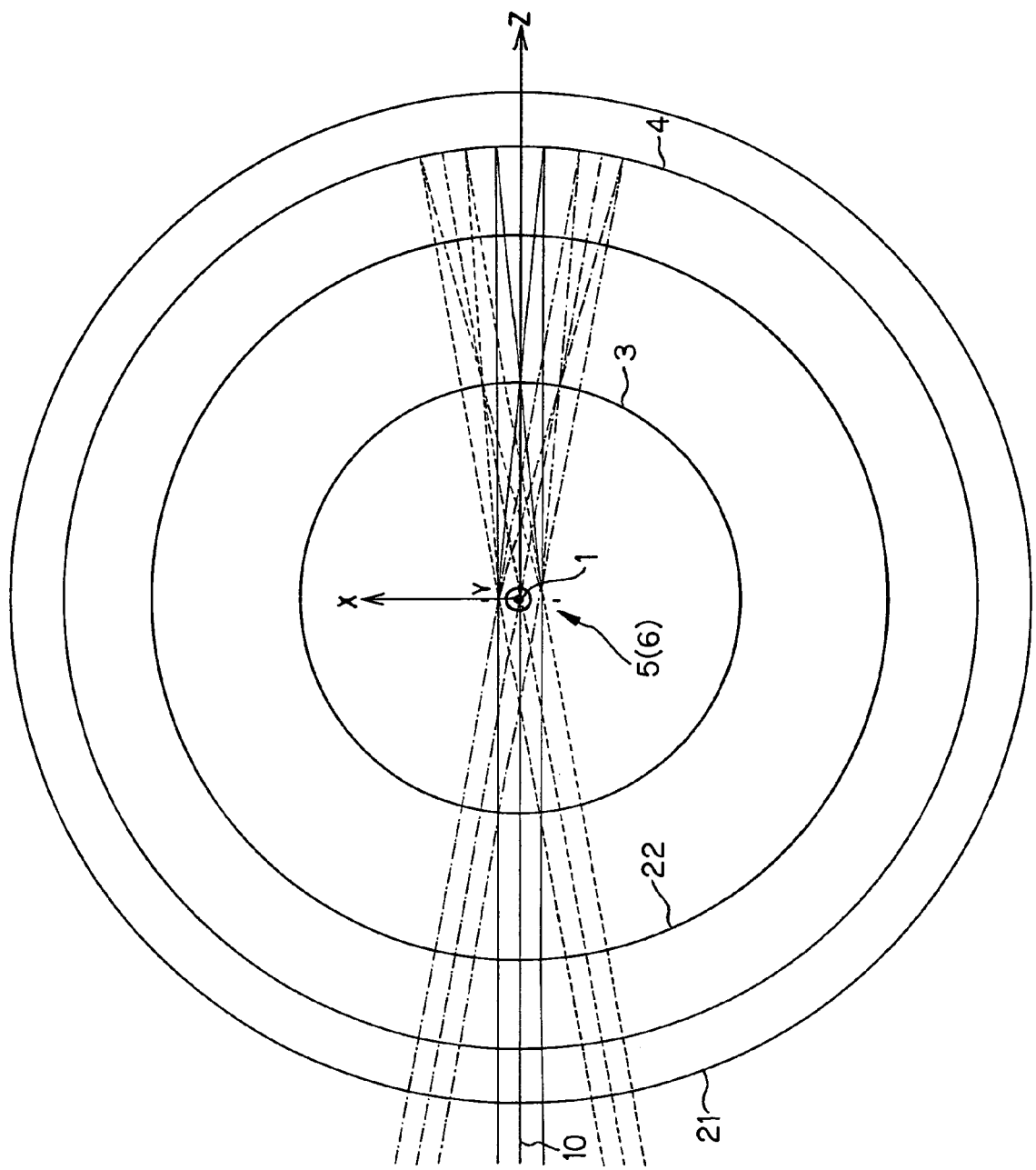
FIG. 2 is a plan view as taken in a direction along the axis of rotational symmetry, illustrative of an optical path through the optical system of Example 1.
Figure 3:
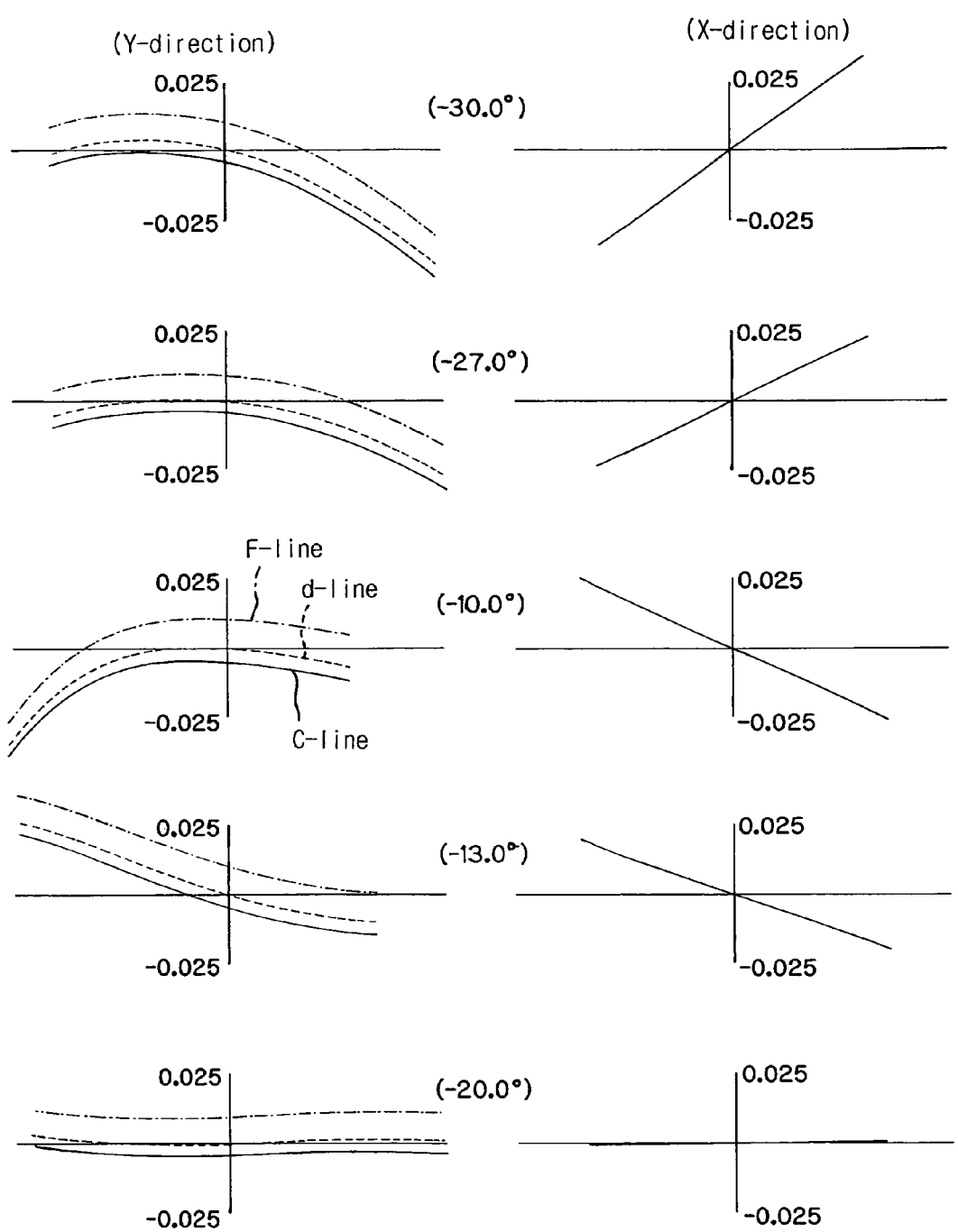
FIG. 3 is a transverse aberration diagram for the whole optical system of Example 1.

FIG. 1 is a sectional view of the optical system of Example 1 as taken along the center axis 1 of rotation, FIG. 2 is a plan view of an optical path through that optical system as viewed along the center axis of rotation 1, and FIG. 3 is a transverse aberration diagram for the whole optical system according to Example 1. In this transverse aberration diagram, the angles right in the middle are indicative of the angles of view in the vertical direction, and Y-direction (meridional) and X-direction (sagittal) transverse aberrations at those angles of view are indicated. Throughout the disclosure, a minus angle of view means a right-handed rotation angle with respect to the X-axis positive direction.

The example here is directed to an imaging optical system built up of an annular refractive optical element 2 rotationally symmetric about the center axis 1 of rotation and one reflective surface 4. The annular refractive optical element 2 is located on the entrance side of, and spaced away from, the reflective surface 4 with the center axis 1 of rotation between them. The refractive optical element 2 comprises an entrance side surface 21 and an exit side surface 22, each composed of an extended rotation free-form surface, the reflective surface 4 is constructed of an extended rotation free-form surface having positive power with respect to both the meridional and the sagittal section, and an image surface 3 is defined by a cylindrical surface. And then, an entrance pupil 5 and an exit pupil 6 are located at a distance on the Y-axis of the axis 1 of rotational symmetry (the center axis of rotation).

As viewed according to normal ray tracing, a light beam from an infinite object point (the projection surface in the case of back ray tracing) makes its way toward the entrance pupil 5, entering the refractive optical element 2 where it is refracted. Then, the light beam takes an oblique decentration optical path with respect to the Y-axis, entering the decentered reflective surface 4, at which it is reflected. The reflected light travels toward the exit pupil 6 away from the entrance pupil 5 on the Y-axis, entering the image surface (the display surface in the case of back ray tracing) 3 located between them, thereby forming an image of the object point.

With such decentered arrangement, the light from the 360° panoramic scene is reflected at the reflective surface 4 via the refractive optical element 2 without interfering with the image surface 3, so that it can be formed into an image in the range of 20° in the vertical angle of view of 10° to 30°.

The specifications of Example 1 are:

| | |
|---|---|
| Horizontal angle of view: | 360° |
| Vertical angle of view: | 20° |
| Entrance pupil diameter: | 1.47 mm |
| Image size: | Cylindrical surface of φ 19.61 mm and 2.80 mm in height |

EXAMPLE 2

Figure 4:
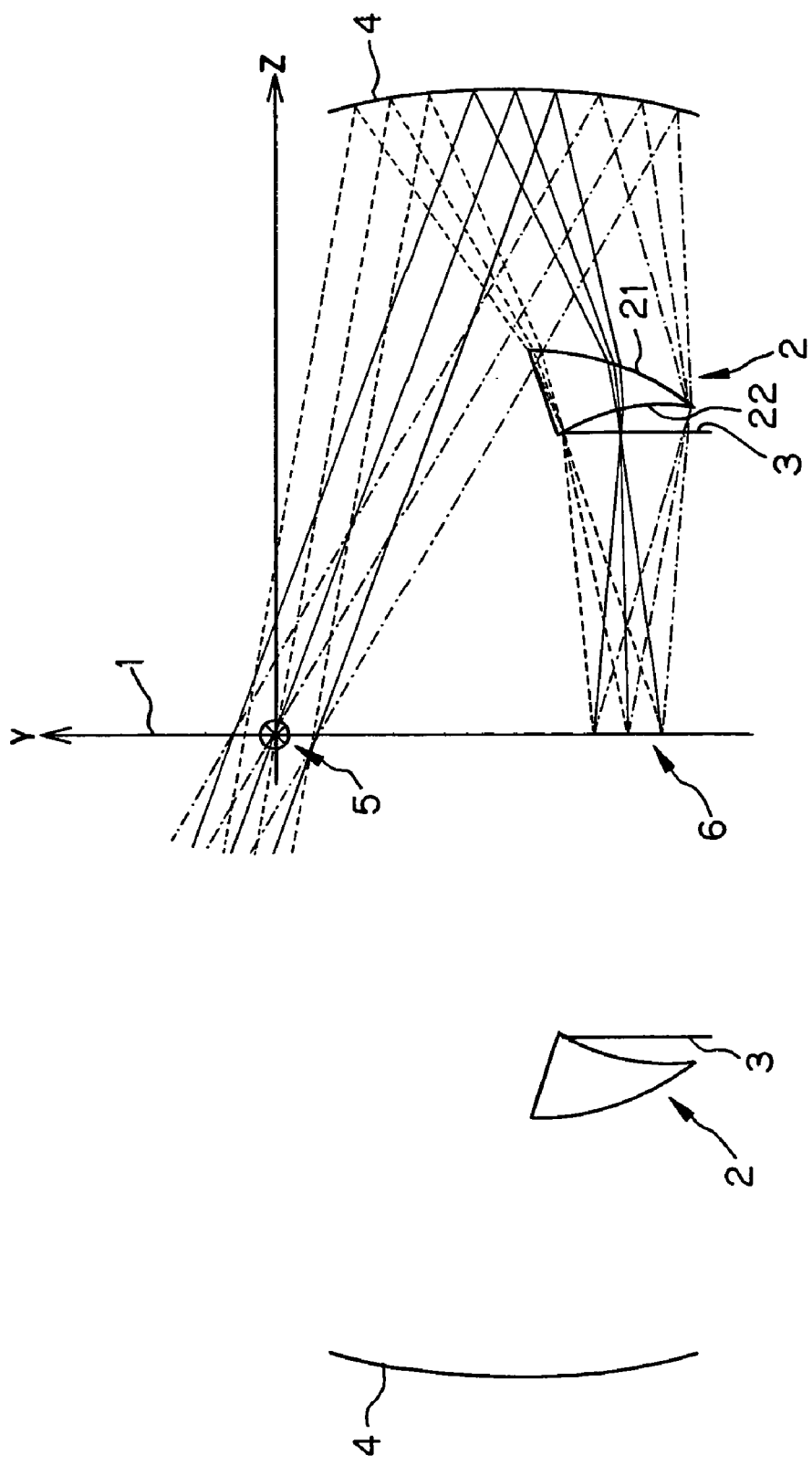
FIG. 4 is illustrative in section of the optical system of Example 2 according to the invention, as taken along the axis of rotational symmetry.
Figure 5:
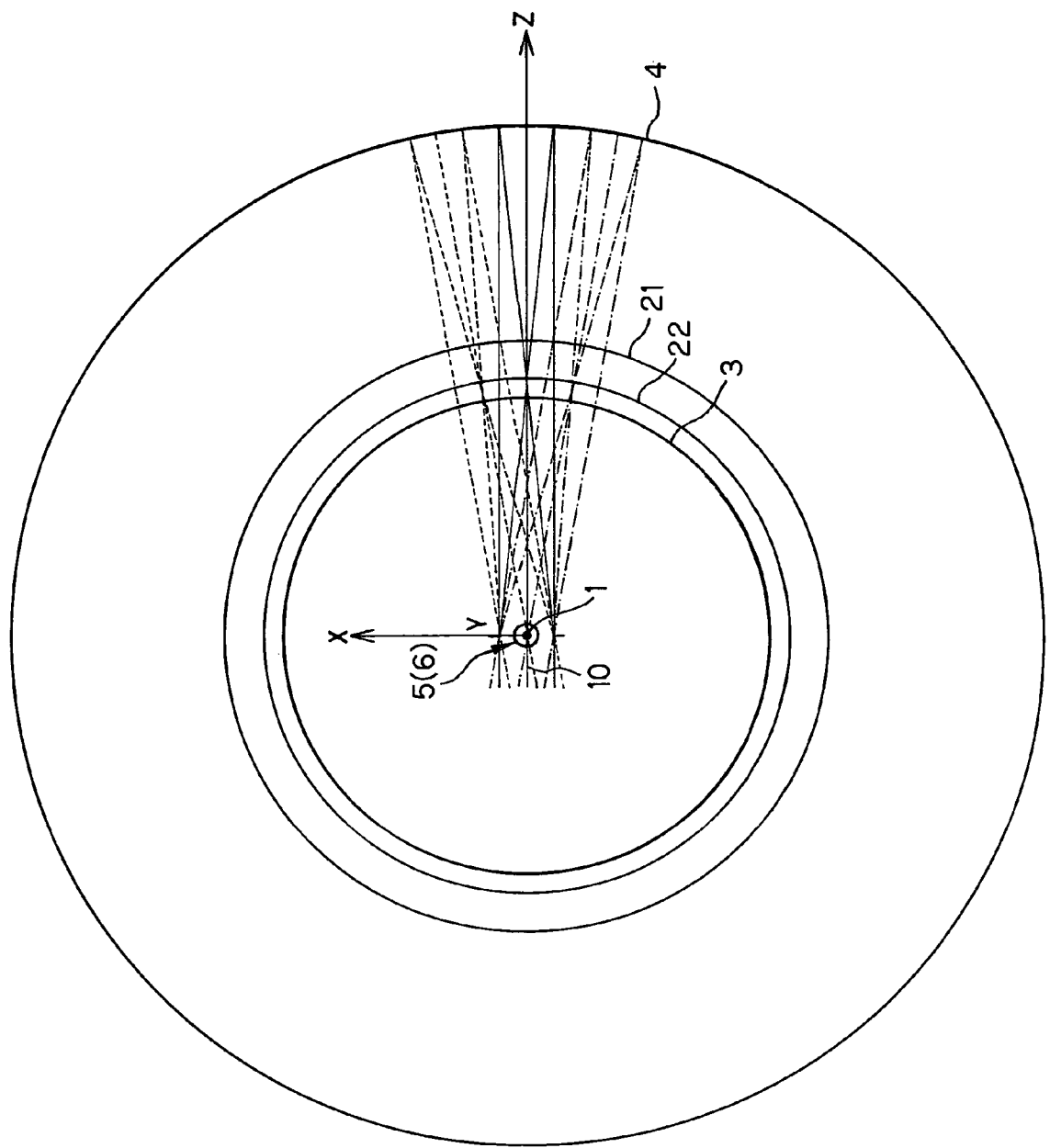
FIG. 5 is a plan view as taken in a direction along the axis of rotational symmetry, illustrative of an optical path through the optical system of Example 2.
Figure 6:
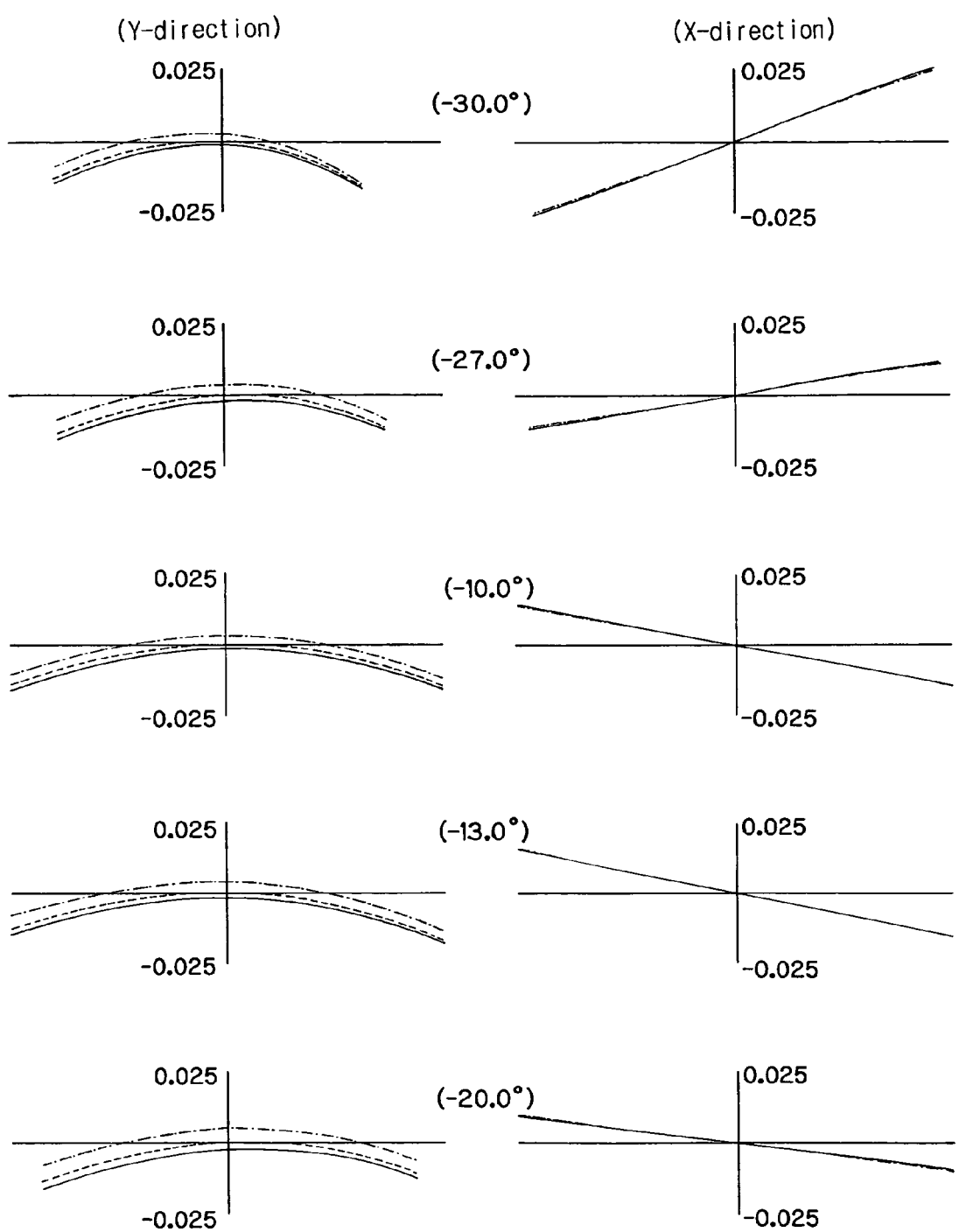
FIG. 6 is a transverse aberration diagram for the whole optical system of Example 2.

FIG. 4 is a sectional view of the optical system of Example 2 as taken along the center axis 1 of rotation, FIG. 5 is a plan view of an optical path through that optical system as viewed along the center axis 1 of rotation, and FIG. 6 is a transverse aberration diagram for the whole optical system according to Example 2.

The example here is directed to an imaging optical system built up of an annular refractive optical element 2 rotationally symmetric about the center axis 1 of rotation and one reflective surface 4. The annular refractive optical element 2 is located between the reflective surface 4 and an image surface 3. The reflective surface 4 is made up of an extended rotation free-form surface having positive power with respect to both the meridional and the sagittal section, and the refractive optical element 2 comprises an entrance side surface 21 composed of an extended rotation free-form surface and an exit side surface 22 composed of a toric surface, and the image surface 3 is defined by a cylindrical surface. And then, an entrance pupil 5 and an exit pupil 6 are located at a distance on the Y-axis of the axis 1 of rotational symmetry (the center axis of rotation).

As viewed according to normal ray tracing, a light beam from an infinite object point (a projection surface in the case of back ray tracing) takes an oblique decentered optical path with respect to the Y-axis, entering the decentered reflective surface 4, at which it is reflected. The reflected light enters the refractive optical element 2 for retraction, and the refracted light then travels toward the exit pupil 6 away from the entrance pupil 5 on the Y-axis, entering the image surface (a display surface in the case of back ray tracing) 3 located between them, thereby forming an image of the object point.

With such decentered arrangement, the light from the 360° panoramic scene is reflected at the reflective surface 4 via the refractive optical element 2 without interfering with the image surface 3, so that it can be formed into an image in the range of 20° in the vertical angle of view of 10° to 30°.

The specifications of Example 2 are:

| | |
|---|---|
| Horizontal angle of view: | 360° |
| Vertical angle of view: | 20° |
| Entrance pupil diameter: | 2.43 mm |
| Image size: | Cylindrical surface of φ 18.04 mm and 3.64 mm in height |

In the example here, the annular refractive optical element 2 is located between the reflective surface 4 and the image surface 3, and in order to correct the field tilt across the meridional section, it is important for the refractive optical element 2 to have a wedge shape where the optical path is longer on the entrance pupil 5 side and shorter on the exit pupil 6 side. Further, in order to correct the field curvature across the meridional section, it is important for the refractive optical element to have a convex lens configuration that has a positive power in the meridional section.

EXAMPLE 3

Figure 7:
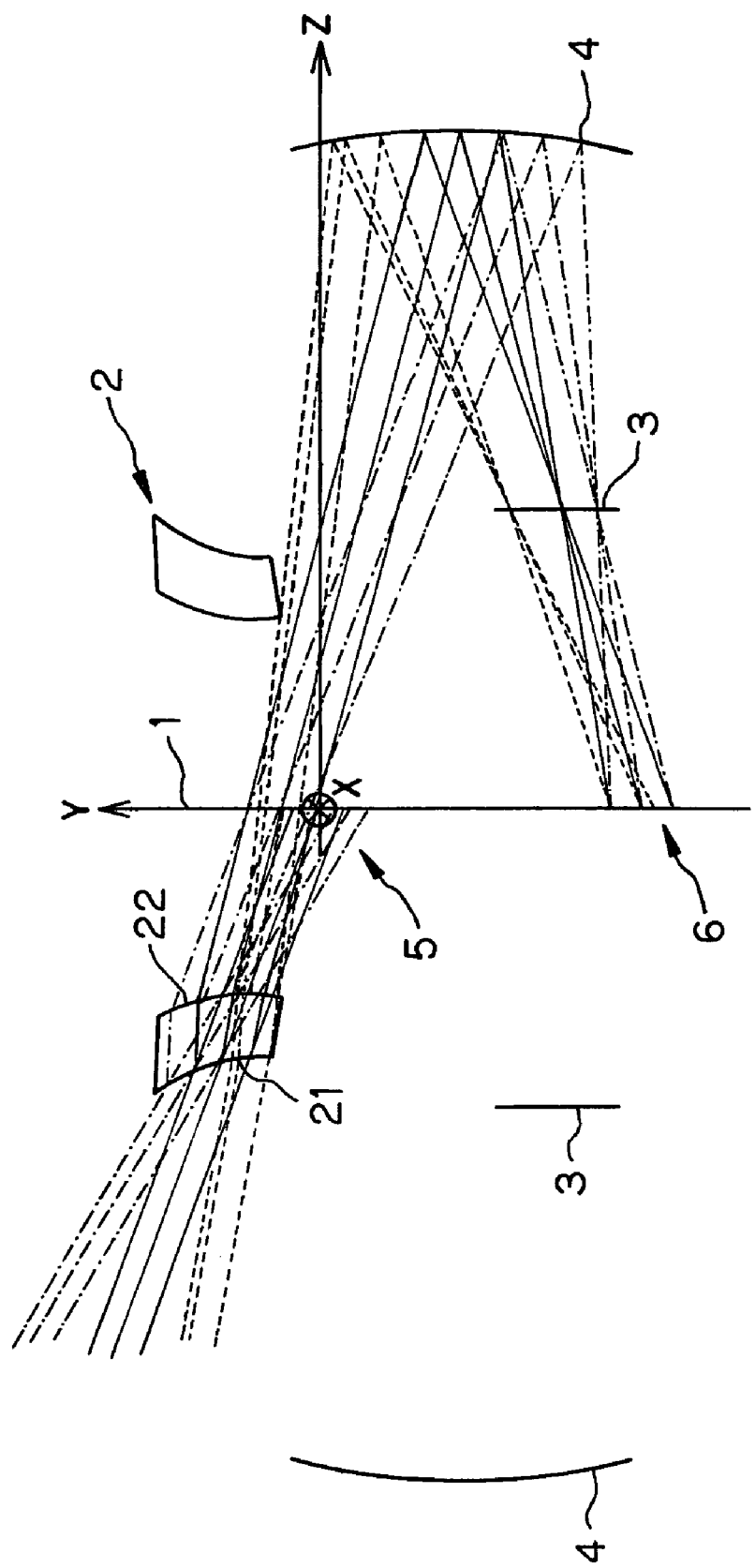
FIG. 7 is illustrative in section of the optical system of Example 3 according to the invention, as taken along the axis of rotational symmetry.
Figure 8:
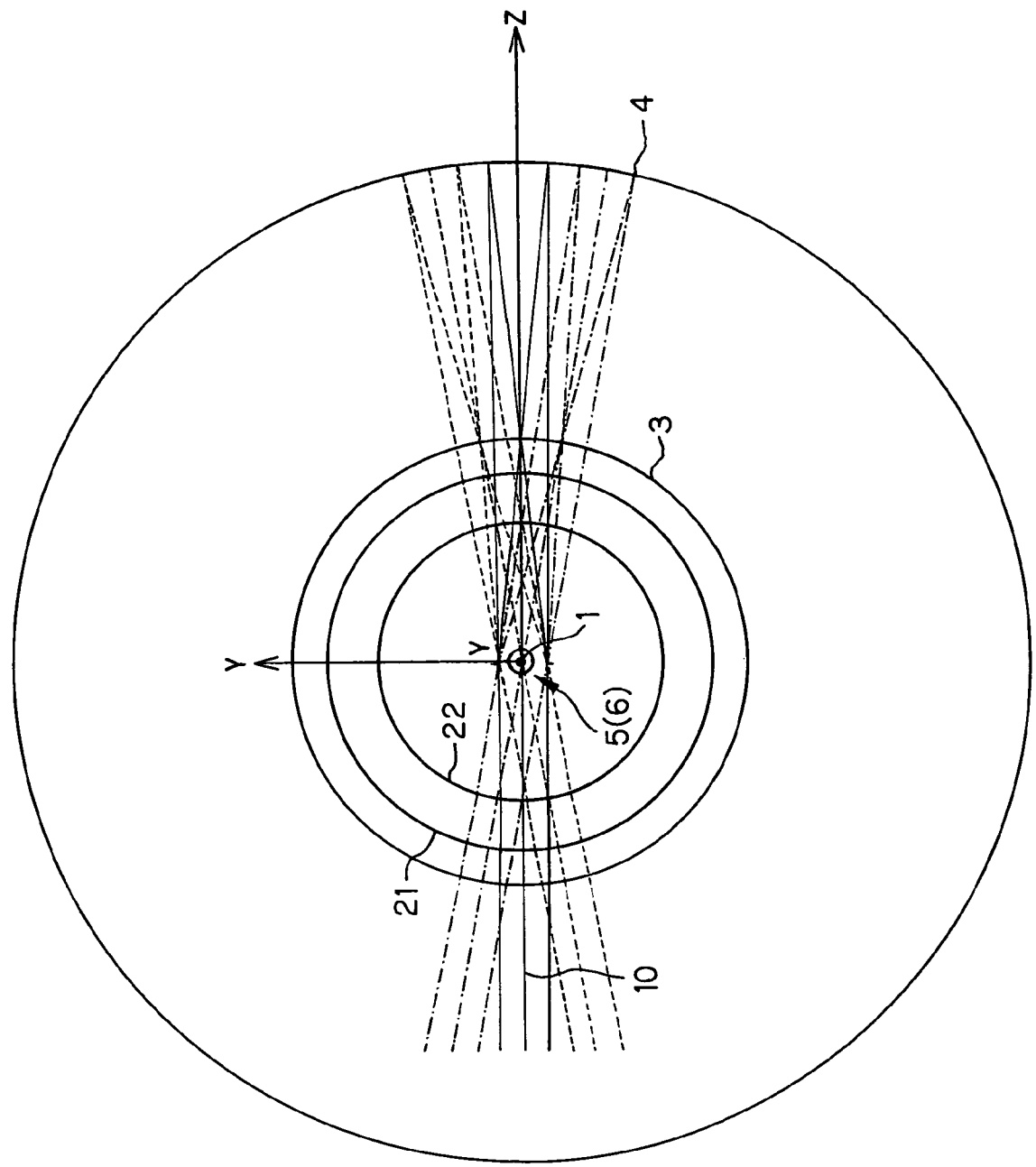
FIG. 8 is a plan view as taken in a direction along the axis of rotational symmetry, illustrative of an optical path through the optical system of Example 3.

FIG. 7 is a sectional view of the optical system of Example 3 as taken along the center axis 1 of rotation, FIG. 8 is a plan view of an optical path through that optical system as viewed along the center axis 1 of rotation, and FIG. 9 is a transverse aberration diagram for the whole optical system according to Example 3.

The example here is directed to an imaging optical system built up of an annular refractive optical element 2 rotationally symmetric about the center axis 1 of rotation and one reflective surface 4. The annular refractive optical element 2 is located on the entrance side of, and spaced away from, the reflective surface 4 with the center axis 1 of rotation between them. The refractive optical element 2 comprises an entrance side surface 21 and an exit side surface 22, each composed of an extended rotation free-form surface, the reflective surface 4 is constructed of an extended rotation free-form surface having positive power with respect to both the meridional and the sagittal section, and an image surface 3 is defined by a cylindrical surface. And then, an entrance pupil 5 and an exit pupil 6 are located at a distance on the Y-axis of the axis 1 of rotational symmetry (the center axis of rotation).

As viewed according to normal ray tracing, a light beam from an infinite object point (a projection surface in the case of back ray tracing) makes its way toward the entrance pupil 5, entering the refractive optical element 2 where it is refracted. Then, the light beam takes an oblique decentered optical path with respect to the Y-axis, entering the decentered reflective surface 4, at which it is reflected. The reflected light travels toward the exit pupil 6 away from the entrance pupil 5 on the Y-axis, entering the image surface (a display surface in the case of back ray tracing) 3 located between them, thereby forming an image of the object point.

With such decentered arrangement, the light from the 360° panoramic scene is reflected at the reflective surface 4 via the refractive optical element 2 without interfering with the image surface 3, so that it can be formed into an image in the range of 20° in the vertical angle of view of 10° to 30°.

The specifications of Example 3 are:

| | |
|---|---|
| Horizontal angle of view: | 360° |
| Vertical angle of view: | 20° |
| Entrance pupil diameter: | 1.60 mm |
| Image size: | Cylindrical surface of φ 19.61 mm and 2.89 mm in height |

In the example here, the annular refractive optical element 2 is located between an object in the 360° panoramic scene in the distance and the reflective surface 4. If a meniscus shape concave on the object as contemplated herein is applied in the meridional section, it is then possible to make good correction of the field tilt across the sagittal section in particular.

Set out below are the essential parameters for Examples 1-3 above. In the following tables, "YTR", "ERFS" and "RE" are indicative of a Y toric surface, an extended rotation free-form surface, and a reflective surface, respectively.

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Entrance Pupil) | | | | |
| 2 | ERFS[1] | | (1) | 1.5163 | 64.1 |
| 3 | ERFS[2] | | (2) | | |
| 4 | ERFS[3] (RE) | | (3) | | |
| 5 | ∞(Exit Pupil) | | (4) | | |
| Image plane | YTR[1] | | (5) | | |

| ERFS[1] | |
|---|---|
| RY | 16.09 |
| θ | 14.45 |

-continued

|   |   |
|---|---|
| R | −23.49 |
| $C_4$ | $7.2361 \times 10^{-4}$ |
| ERFS[2] | |
| RY | 8.42 |
| θ | 6.91 |
| R | −16.95 |
| $C_4$ | $3.7170 \times 10^{-3}$ |
| ERFS[3] | |
| RY | −20.55 |
| θ | 0.00 |
| R | 20.53 |
| $C_4$ | $1.8569 \times 10^{-4}$ |
| $C_5$ | $1.5017 \times 10^{-6}$ |
| YTR[1] | |
| Rx | −9.81 |
| Ry | ∞ |

Displacement and tilt(1)

| X | 0.00 | Y | 8.55 | Z | 0.00 |
|---|------|---|------|---|------|
| α | 0.00 | β | 0.00 | γ | 0.00 |

Displacement and tilt(2)

| X | 0.00 | Y | 7.70 | Z | 0.00 |
|---|------|---|------|---|------|
| α | 0.00 | β | 0.00 | γ | 0.00 |

Displacement and tilt(3)

| X | 0.00 | Y | −2.47 | Z | 0.00 |
|---|------|---|-------|---|------|
| α | 0.00 | β | 0.00  | γ | 0.00 |

Displacement and tilt(4)

| X | 0.00 | Y | −8.08 | Z | 0.00 |
|---|------|---|-------|---|------|
| α | 0.00 | β | 0.00  | γ | 0.00 |

Displacement and tilt(5)

| X | 0.00 | Y | −5.37 | Z | 0.00 |
|---|------|---|-------|---|------|
| α | 0.00 | β | 0.00  | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Entrance Pupil) | | | | |
| 2 | ERFS[1] (RE) | | (1) | | |
| 3 | ERFS[2] | | (2) | 1.5163 | 64.1 |
| 4 | ERFS[3] | | (3) | | |
| 5 | ∞(Exit Pupil) | | (4) | | |
| Image plane | YTR[1] | | (5) | | |

ERFS[1]

|   |   |
|---|---|
| RY | −21.16 |
| θ | 0.00 |
| R | 19.11 |
| $C_4$ | $8.2640 \times 10^{-5}$ |
| $C_5$ | $-4.4538 \times 10^{-6}$ |
| ERFS[2] | |
| RY | −7.16 |
| θ | −18.54 |
| R | 11.09 |
| $C_4$ | $-2.3794 \times 10^{-4}$ |
| $C_5$ | $-2.0476 \times 10^{-4}$ |
| ERFS[3] | |
| RY | −5.38 |
| θ | 13.30 |
| R | 9.72 |
| YTR[1] | |
| Rx | −9.02 |
| Ry | ∞ |

Displacement and tilt(1)

| X | 0.00 | Y | −6.95 | Z | 0.00 |
|---|------|---|-------|---|------|
| α | 0.00 | β | 0.00  | γ | 0.00 |

Displacement and tilt(2)

| X | 0.00 | Y | −9.87 | Z | 0.00 |
|---|------|---|-------|---|------|
| α | 0.00 | β | 0.00  | γ | 0.00 |

Displacement and tilt(3)

| X | 0.00 | Y | −10.01 | Z | 0.00 |
|---|------|---|--------|---|------|
| α | 0.00 | β | 0.00   | γ | 0.00 |

Displacement and tilt(4)

| X | 0.00 | Y | −10.30 | Z | 0.00 |
|---|------|---|--------|---|------|
| α | 0.00 | β | 0.00   | γ | 0.00 |

Displacement and tilt(5)

| X | 0.00 | Y | −10.03 | Z | 0.00 |
|---|------|---|--------|---|------|
| α | 0.00 | β | 0.00   | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Entrance Pupil) | | | | |
| 2 | ERFS[1] | | (1) | 1.5163 | 64.1 |
| 3 | ERFS[2] | | (2) | | |
| 4 | ERFS[3] (RE) | | (3) | | |
| 5 | ∞(Exit Pupil) | | (4) | | |
| Image plane | YTR[1] | | (5) | | |

ERFS[1]

|   |   |
|---|---|
| RY | −4.96 |
| θ | 14.42 |
| R | −8.41 |
| $C_4$ | $6.5811 \times 10^{-3}$ |
| ERFS[2] | |
| RY | −5.34 |
| θ | 6.12 |
| R | −6.22 |
| $C_4$ | $3.6493 \times 10^{-3}$ |
| ERFS[3] | |
| RY | −24.25 |
| θ | 0.00 |
| R | 21.95 |
| $C_4$ | $2.0406 \times 10^{-4}$ |
| $C_5$ | $-7.9282 \times 10^{-6}$ |
| YTR[1] | |
| Rx | −9.81 |
| Ry | ∞ |

-continued

| Displacement and tilt(1) | | | | | |
|---|---|---|---|---|---|
| X | 0.00 | Y | 3.06 | Z | 0.00 |
| α | 0.00 | β | 0.00 | γ | 0.00 |
| Displacement and tilt(2) | | | | | |
| X | 0.00 | Y | 2.77 | Z | 0.00 |
| α | 0.00 | β | 0.00 | γ | 0.00 |
| Displacement and tilt(3) | | | | | |
| X | 0.00 | Y | −4.63 | Z | 0.00 |
| α | 0.00 | β | 0.00 | γ | 0.00 |
| Displacement and tilt(4) | | | | | |
| X | 0.00 | Y | −10.45 | Z | 0.00 |
| α | 0.00 | β | 0.00 | γ | 0.00 |
| Displacement and tilt(5) | | | | | |
| X | 0.00 | Y | −7.82 | Z | 0.00 |
| α | 0.00 | β | 0.00 | γ | 0.00 |

The optical system of the invention has been described with reference to Examples 1-3. However, it is understood that if a Y toric lens is added to the object side away from the entrance pupil 5 in coaxial relation to the center axis 1 of rotation, the Y toric lens is configured into a lens built up of a surface of rotational symmetry with respect to the Y-axis (the center axis 1 of rotation) and the Y toric lens is allowed to have no power in the X-direction but have negative power in the Y-direction (within the section of FIG. 1, etc.), it is then possible to make large the angle of view in the sectional direction including the axis 1 of rotational symmetry. More preferably, if that toric lens is configured into a negative meniscus lens convex on the object side in the Y-Z section, it is then possible to minimize the occurrence of image distortion and, hence, make good correction of aberrations.

Further, if one Y toric lens of negative meniscus lens shape in section plus two or three lenses of meniscus shape are located on the object side of the entrance pupil 5, it is then possible to reduce the occurrence of image distortion as much as possible. It is also easy to use not only the lenses but also a reflective surface or prism rotationally symmetric with respect to the center axis 1 of rotation, thereby reflecting and refracting light rays in any desired direction for projection or image formation.

Furthermore, by using the refractive optical element 2 and reflective surface 4 rotationally symmetric about the center axis 1 of rotation of the optical system according to the invention as they stand, it is possible to take or project images having a full 360° azimuth direction angle of view. However, if the refractive optical element 2 and reflective surface 4 are divided in the section including the center axis 1 of rotation into ½, ⅓, ⅔, etc., it is then possible to take or project images having an angle of view of 180°, 120°, 240°, etc. about the center axis 1.

The optical system of the invention has been described as an imaging optical system adapted to form images from a 360° (full) panoramic scene in the distance on a cylindrical image surface while the center axis 1 of rotation (the axis of rotational symmetry) is directed in the vertical direction. If the optical path is reversed, that optical system could be used as a projection optical system adapted to project images on a cylindrical, conical or other three-dimensional display device onto a 360° (full) field of view while the center axis 1 of rotation (the axis of rotational symmetry) is directed in the vertical direction.

Further, the image surface 3 could be defined by not only the cylindrical surface but also by a rotationally symmetric surface such as a conical surface.

Furthermore, the toric surface and extended rotation free-form surface could be built up of a Fresnel surface, and the optical system of the invention could be used as a circular viewing optical system for tract scopes such as endoscopes. On the other hand, the reflective surface could be constructed from a cylindrical linear Fresnel reflective surface that is grooved in a circumferential direction.

Figure 10B:
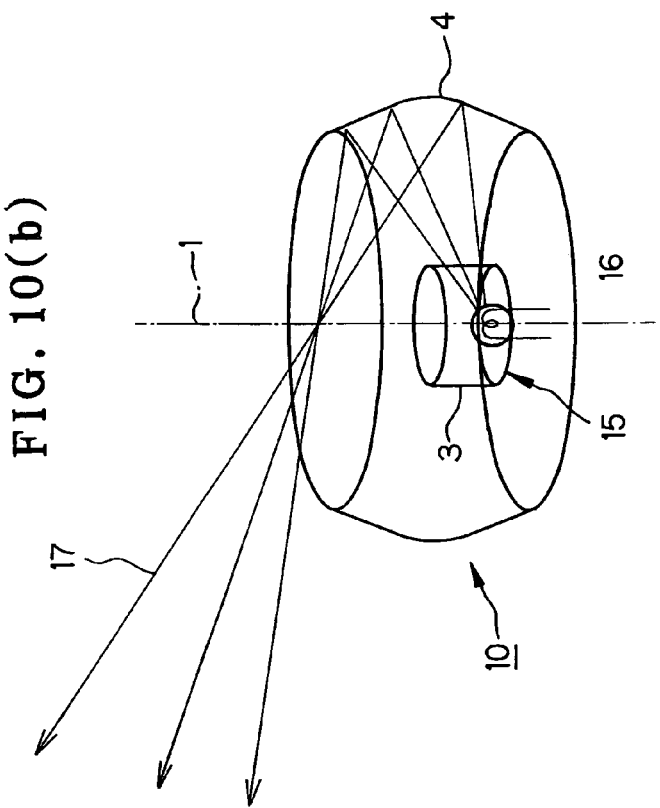
FIG. 10($a$) is illustrative in schematic of an optical path in the event that the optical system of the invention is used as a panoramic taking optical system, and FIG. 10($b$) is illustrative in schematic of an optical path in the event that it is used as a panoramic projection optical system.
Figure 10A:
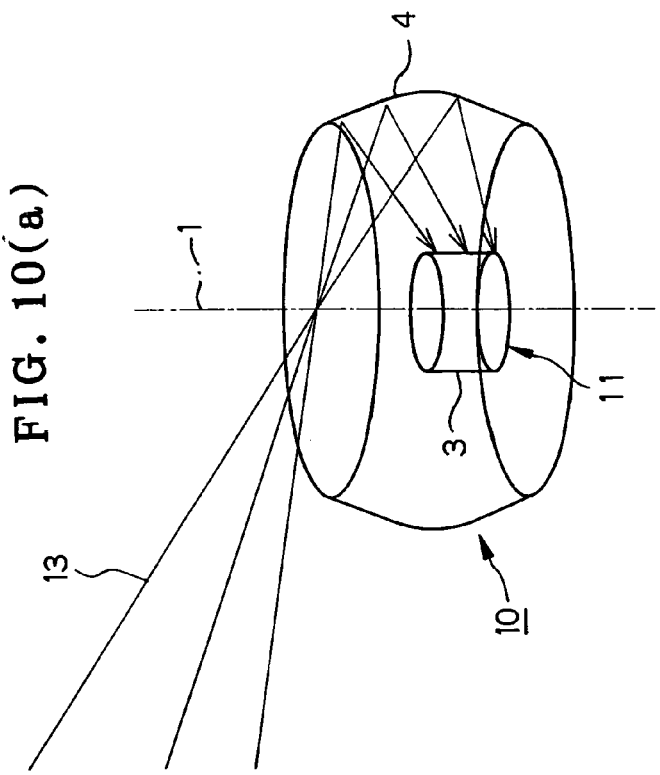

FIGS. 10(*a*) and 10(*b*) are illustrative in schematic of an optical path in the event that the optical system of the invention is used as (a) a panoramic taking optical system, and (b) a panoramic projection optical system. When it is used as the panoramic taking optical system, an imaging device 11 having a cylindrical, spherical, conical or other rotationally symmetric three-dimensional imaging surface 3 is located coaxially with the axis 1 of rotational symmetry of an optical system 10 according to the invention, as shown in FIG. 10(*a*). As light 13 from objects in the 360° panoramic scene is incident on that optical system 10, it enables a panoramic image to be formed on the imaging surface 3 to take it.

When it is used as the panoramic projection optical system, a display device 15 having a cylindrical, spherical, conical or other rotationally symmetric three-dimensional display surface 3 is located coaxially with the axis 1 of rotational symmetry of an optical system 10 according to the invention, as shown in FIG. 10(*b*). As an illumination light source 16 located behind the display surface 3 of the display device 15 is put on while 360° panoramic images to be projected are displayed on that display surface 3, projection light 17 from that display surface 3 passes through the optical system 10 to project the 360° panoramic images onto a cylindrical, semi-circular or other screen in the distance.

What is claimed is:

1. An optical system adapted to form images from a 360° panoramic scene on a cylindrical or conical image surface, comprising:
    an annular refractive optical element with a center axis of rotation of the image surface as an axis of rotational symmetry, and
    at least one reflective surface with said center axis of rotation as an axis of rotational symmetry.

2. The optical system according to claim 1, characterized in that said annular refractive optical element has a power with respect to a sagittal section different from a power with respect to a meridional section.

3. The optical system according to claim 1, characterized by satisfying the following condition:

$$1.1 < |Pms|, \text{ or } |Pms| < 0.9 \quad (1)$$

where Pms is a power ratio between a meridional section and a sagittal section of at least one surface of said refractive optical element.

4. The optical system according to claim 1, characterized in that said refractive optical element is located on an entrance side of, and spaced away from, said reflective surface on an optical path with the center axis of rotation positioned between them.

5. The optical system according to claim 1, characterized in that said refractive optical element is located between said reflective surface and said image surface on an optical path.

6. The optical system according to claim 1, characterized in that said optical system comprises an entrance pupil and an exit pupil on or near said axis of rotational symmetry, said refractive optical element, said reflective surface and said image surface are located off said axis of rotational symmetry, and light of an image from the 360° panoramic scene takes a decentered optical path where said light travels in order of the refractive optical element, entrance pupil, reflective surface, image surface and exit pupil, or in order of the entrance pupil, reflective surface, refractive optical element, image surface and exit pupil.

7. The optical system according to claim 1, characterized in that said reflective surface has a rotationally symmetric shape defined by rotation about the axis of rotational symmetry of a line segment of any shape that has no plane of symmetry in a section including the axis of rotational symmetry.

8. The optical system according to claim 1, characterized in that said reflective surface has a rotationally symmetric shape defined by rotation about the axis of rotational symmetry of a line segment of any shape that includes an odd-numbered term in a section including the axis of rotational symmetry.

9. The optical system according to claim 1, characterized by being used as a projection optical system wherein the object surface and the image surface are reversed.

* * * * *